Patented Mar. 30, 1943

2,315,129

UNITED STATES PATENT OFFICE 2,315,129

ALKYLATION PROCESS

Arlie A. O'Kelly, Woodbury, N. J., and Robert H. Work, Philadelphia, Pa., assignors to Socony-Vacuum Oil Company, Incorporated, New York, N. Y., a corporation of New York No Drawing. Application September 10, 1940, Serial No. 356,186

6 Claims. (Cl. 196—10)

This invention relates to the alkylation of paraffinic hydrocarbons with olefinic hydrocarbons. The invention is concerned particularly with the manufacture of high octane gasolines by the catalytic alkylation of normally gaseous paraffins with normally gaseous olefins.

Several processes have been developed recently for the alkylation of paraffins with olefins. For the most part these processes have made use of some particular alkylation catalyst. For instance, sulfuric acid and aluminum chloride have been used at low temperatures. Phosphoric acid has been used at higher temperatures. Again O'Kelly et al., in the co-pending application Serial No. 324,085, filed March 15, 1940, have disclosed certain metal chlorides and fluorides as alkylation catalysts at high temperatures and pressures.

It is an object of our invention to improve the efficiency of catalytic alkylation processes. A more specific object is to improve the efficiency of catalytic alkylation processes for manufacturing high octane gasoline by alkylating normally gaseous paraffins with normally gaseous olefins.

According to our invention, we alkylate paraffins with olefins in the presence of an alkylation catalyst and a hydrogenation catalyst that is active under the same conditions as the alkylation catalyst.

Hydrogenation is a well established art. For this reason catalysts that bring about hydrogenation are well known as also are the conditions under which each is most effective. Numerous hydrogenation catalysts may be mentioned by way of example, as, for instance, metal oxides, such as the oxides of molybdenum, cobalt, chromium, iron, copper, etc.; metal sulfides, as, for example, molybdenum sulfide; and various metals themselves such as molybdenum, copper, cobalt, chromium, etc.

While, as is obvious, our invention has a wider application, we prefer to use alkylation catalysts of the type disclosed in O'Kelly et al. application Serial No. 324,085, namely, metal chlorides or fluorides which are solid, stable compounds at temperatures above about 600° F., and pressures above about 2000 pounds per square inch, with special preference being given to such chlorides or fluorides of the alkaline earth metals. An outstanding feature of alkylation processes using such catalysts is that either normal paraffins or isoparaffins may be alkylated.

In preparing a combination catalyst for the process of the present invention, we select a desired alkylation catalyst and then associate therewith in any suitable manner an appropriate weight percent of a hydrogenation catalyst which is known to be active under the same condition as the selected alkylation catalyst. The amount of hydrogenation catalyst associated with the alkylation catalyst may vary over a rather wide range and still give improved results, as, for instance, from about 0.5% to about 10.0%. The actual alkylation operation of our process is conducted in substantially the same manner as though only the alkylation catalyst were being used. But by using our combination alkylation-hydrogenation catalyst a larger yield of alkylate product may be obtained than by using only the alkylation catalyst at the same temperature, or a lower temperature may be used in our process to obtain the same yield as is obtained with an alkylation catalyst alone.

While we do not wish to be held to any particular theory, it is believed the increased efficiency obtained by our process is due to the similarity between an alkylation reaction and a hydrogenation reaction. This similarity is shown in the following reactions where R represents an alkyl radical.

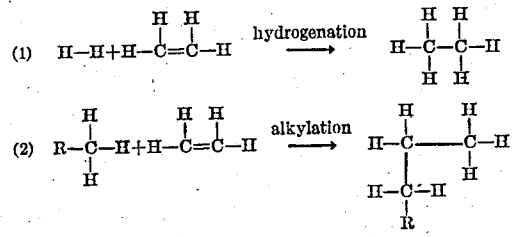

It will be seen from the equations that in the hydrogenation reaction both constituents being added to the olefin at the double bond are hydrogen atoms, while in the alkylation reaction one constituent is a hydrogen atom and the other an alkyl radical.

As indicated above, we particularly prefer certain metal chlorides or fluorides as alkylation catalysts, and such a catalyst is fluorspar. Chromium oxide is a well known hydrogenation catalyst which is active under substantially the same condition as fluorspar. Accordingly, a preferred combination catalyst for the present invention comprises fluorspar plus chromium oxide. Catalyst of this type may be used also in connection with inert carriers for added support, if desired. Suitable carriers comprise alumina, bauxite, ZnO, MgO, etc. In using a catalyst of this type we recommend temperatures above about 800° F., preferably from about 800° F. to about 900° F., and a pressure above about 2000 lbs. per sq. in., In order to illustrate our invention further, we set forth below typical comparative data showing the increased efficiency resulting from the use of the combination of an alkylation and a hydrogenation catalyst rather than the same alkylation catalyst alone or using only thermal alkylation.

| Run No. | Per cent olefin in charge | Catalyst used and per cent by wt. with respect to charge | Reaction temp. in °F. | Reaction time in mins. | Reaction pres. in lbs. per sq. in. gauge |
|---|---|---|---|---|---|
| 1 | 15 | None | 800 | 30 | 2800 |
| 2 | 15 | ....do.... | 850 | 30 | 3100 |
| 3 | 15 | Fluorspar heated at 950° F. 3 hrs. (20.8%). | 875 | 30 | 3330 |
| 4 | 15 | Fluorspar heated at 1000° F. 1½ hrs., plus 2% Cr$_2$O$_3$ (20.8%). | 875 | 30 | 3425 |
| 5 | 15 | Fluorspar+2% Cr$_2$O$_3$ (21%). | 850 | 30 | 3100 |
| 6 | 15 | Fluorspar+2% Cr$_2$O$_3$ (17%). | 825 | 30 | 3825 |
| 7 | 15 | ....do.... | 800 | 30 | 3650 |
| 8 | 15 | Fluorspar+10% Cr$_2$O$_3$ (20.8%). | 825 | 30 | 3300 |
| 9 | 15 | Fluorspar+Al$_2$O$_3$ +2% Cr$_2$O$_3$ (26%) | 825 | 30 | 2750 |
| 10 | 15 | ....do.... | 850 | 15 | 3400 |

| Run No. | Percent vol. conversion respect to olefin | Specific gravity of 25–160° C. fraction | Iodine No. of 25–160° C. fraction |
|---|---|---|---|
| 1 | 58.6 | 0.720 | 67.0 |
| 2 | 102 | 0.710 | 52.0 |
| 3 | 131.5 | 0.686 | 35.0 |
| 4 | 166.6 | 0.685 | 35.0 |
| 5 | 156.6 | 0.684 | 25.0 |
| 6 | 126.6 | 0.685 | 35.0 |
| 7 | 113.3 | 0.685 | 49.0 |
| 8 | 152.5 | 0.686 | 35.0 |
| 9 | 139.1 | 0.687 | 37.0 |
| 10 | 147.5 | 0.687 | 32.0 |

That the proposed catalyst gives predominantly alkylation reactions is borne out by the relatively low iodine numbers, around 35, and by the low specific gravities of the product. The non-catalytic process, as shown in the table, produces a product essentially higher in olefin content and resultantly higher specific gravity. This is due to a preponderance of polymerization reactions leading to heavier olefin formation.

The predominance of polymerization in the non-catalytic process and of alkylation in the catalytic process is further attested to by the difference in yield of product per pass, since it is hardly likely, for example, that a charge of 120 parts butylene and 680 parts butane (liquid charge) would yield 200 parts of product if only polymerization occurred (see run 4). It also will be noted that a definite improvement in yield is obtained by our process over that given by only an alkylation catalyst (see run 3).

We claim:

1. The process of alkylating paraffins with olefins wherein paraffins and olefins are charged to the alkylation reaction which comprises contacting the paraffins and olefins under alkylating conditions in the presence of an alkylation catalyst and a hydrogenation catalyst that has appreciable hydrogenation activity at said alkylating conditions.

2. The process of manufacturing high octane motor fuel by alkylating normally gaseous paraffins with normally gaseous olefins wherein paraffins and olefins are charged to the alkylation reaction which comprises contacting the paraffins and olefins under alkylating conditions in the presence of an alkylation catalyst and a hydrogenation catalyst that has appreciable hydrogenation activity under said alkylating conditions.

3. The process of manufacturing high octane motor fuel by alkylating paraffins with olefins wherein paraffins and olefins are charged to the alkylation reaction which comprises contacting low boiling paraffins and olefins under alkylating conditions in the presence of an alkylation catalyst, selected from the groups consisting of alkaline earth metal chlorides and fluorides, and a hydrogenation catalyst that has appreciable hydrogenation activity under said alkylating conditions.

4. The process of manufacturing high octane motor fuel by alkylating normally gaseous paraffins with normally gaseous olefins wherein paraffins and olefins are charged to the alkylation reaction which comprises contacting the paraffins and olefins at a temperature above about 800° F. and a pressure above about 2000 pounds per square inch in the presence of an alkylation catalyst, selected from the group consisting of alkaline earth metal chlorides and fluorides, and a hydrogenation catalyst that has appreciable hydrogenation activity under said alkylating conditions.

5. The process of manufacturing high octane motor fuel by alkylating normally gaseous paraffins with normally gaseous olefins wherein paraffins and olefins are charged to the alkylation reaction which comprises contacting the paraffins and olefins at a temperature above about 800° F. and under a pressure above about 2000 pounds per square inch in the presence of an alkylation catalyst, selected from the group consisting of alkaline earth metal chlorides and fluorides, and a chromic oxide hydrogenation catalyst.

6. The process of manufacturing high octane motor fuel by alkylating normally gaseous paraffins with normally gaseous olefins wherein paraffins and olefins are charged to the alkylation reaction which comprises contacting the paraffins and olefins at a temperature between about 800° F. and about 900° F. and under a pressure above about 2000 pounds per square inch in the presence of an alkylation catalyst, selected from the group consisting of alkaline earth metal chlorides and fluorides and a chromic oxide hydrogenation catalyst.

ARLIE A. O'KELLY.
ROBERT H. WORK.

CERTIFICATE OF CORRECTION.

Patent No. 2,315,129.                                March 30, 1943.

ARLIE A. O'KELLY, ET AL.

It is hereby certified that error appears in the printed specification of the above numbered patent requiring correction as follows: Page 2, first column, line 34, in the table, second column thereof, for "131.5" read --131.6--; and that the said Letters Patent should be read with this correction therein that the same may conform to the record of the case in the Patent Office.

Sealed and sealed this 3rd day of August, A. D. 1943.

(Seal)

Henry Van Arsdale,
Acting Commissioner of Patents.

DISCLAIMER 2,315,129.—*Arlie A. O'Kelly*, Woodbury, N. J., and *Robert H. Work*, Philadelphia, Pa. ALKYLATION PROCESS. Patent dated March 30, 1943. Disclaimer filed October 8, 1943, by the assignee, *Socony-Vacuum Oil Company, Incorporated*.

Hereby enters this disclaimer to claims 1 and 2 in said patent.

[*Official Gazette November 9, 1943.*]